United States Patent [19]

Brand et al.

[11] Patent Number: 5,489,563
[45] Date of Patent: Feb. 6, 1996

[54] PLATINUM ALLOY CATALYST FOR FUEL CELLS AND METHOD OF ITS PRODUCTION

[75] Inventors: Reinhold Brand, Hanau; Andreas Freund, Kleinostheim; Jutta Lang, Alzenau; Thomas Lehmann, Langenselbold; Johannes Ohmer, Gruendau; Thomas Tacke, Friedrichsdorf; Gerhard Heinz, Hasselroth; Robert Schwarz, Rodenbach, all of Germany

[73] Assignee: Degussa Aktiengesellschaft, Frankfurt am Main, Germany

[21] Appl. No.: 324,140

[22] Filed: Oct. 17, 1994

[30] Foreign Application Priority Data

Jul. 29, 1994 [DE] Germany ............... 44 26 973.0

[51] Int. Cl.⁶ ............... B01J 21/18; B01J 23/26; B01J 23/42
[52] U.S. Cl. ............... 502/185; 429/44; 429/42; 502/313
[58] Field of Search .......... 429/44, 42; 502/185

[56] References Cited

U.S. PATENT DOCUMENTS

| | | | |
|---|---|---|---|
| 4,447,506 | 5/1994 | Luczak et al. | 429/44 |
| 4,677,092 | 6/1987 | Luczak et al. | 502/185 |
| 4,985,386 | 1/1991 | Tsurumi et al. | 429/44 |
| 5,068,161 | 11/1991 | Keck et al. | 502/185 |
| 5,068,214 | 11/1991 | Cordier et al. | 502/185 |
| 5,096,866 | 3/1992 | Itoh et al. | 502/185 |

FOREIGN PATENT DOCUMENTS

| | | |
|---|---|---|
| 0405849 | 10/1991 | European Pat. Off. |
| 2242203 | 9/1991 | United Kingdom. |
| WO/19566 | 12/1991 | WIPO. |

*Primary Examiner*—Asok Pal
*Attorney, Agent, or Firm*—Beveridge, DeGrandi, Weilacher & Young

[57] ABSTRACT

A ternary platinum alloy catalyst on a conductive carbon carrier for use in fuel cells is disclosed. For the production of the catalyst, nitrate salts are used as precursors of the alloy components and all alloy components are deposited concurrently on the carbon carrier. This method of procedure yields ageing-stable catalysts with high oxygen mass activity.

23 Claims, 2 Drawing Sheets

PLATINUM ALLOY CATALYST FOR FUEL CELLS AND METHOD OF ITS PRODUCTION

The present invention relates to a platinum alloy catalyst and to a method for its production for use in fuel cells.

Platinum catalysts and especially alloyed platinum catalysts on electrically conductive carbon carriers are used as electrode catalysts for anodes and/or cathodes in fuel cells, preferably in phosphoric acid fuel cells (PAFC) and polymer electrolyte membrane fuel cells (PEMFC). Typical fuels used on the cathode side are oxygen and air and on the anode side hydrogen, hydrocarbons such as for example, methane, oxygen-containing hydrocarbons such as for example, alcohols or their reformates. The platinum content is in a range of 7–60% by weight, preferably in a range of 10–35% by weight relative to the catalyst. Carbon blacks, graphitized blacks, graphite, carbides and their physical mixtures are used as electrically conductive carbon carriers as a function of the electrode side.

It is known that the purposeful electric performance capability or power of a phosphoric acid fuel cell is essentially a function of the activity of the cathode catalyst. A rather high current density at a given voltage as well as a rather low voltage drop during the service life of the fuel cell catalyst are therefore especially to be desired. This causes the costs per current unit generated to drop.

Suitable catalyst systems with good performance data have proved to be ternary platinum alloy catalysts, especially platinum catalysts containing cobalt and chromium as further alloy components.

Various methods for producing such alloy catalysts are described in the patent literature. The individual methods differ essentially in the precursors used for the alloy components and in the manner of deposition of the alloy components on the conductive carbon carrier. The manner of deposition is of decisive significance since the fineness of the later alloy particles on the carrier and therewith the catalytically active metal surface available for the electrochemical process are also determined by this method step.

After deposition on the carrier the alloy components can be reduced wet-chemically or by a gaseous phase reduction.

All known methods conclude the production of the catalyst with a temperature treatment between 800 and 1000° C. in an inert or reducing atmosphere. The reduction of the alloy components is concluded by this temperature treatment. During the cooling down to room temperature the alloy particles, which are first present as an unordered or random alloy, are converted into a largely ordered alloy with a primarily cubically face-centered or a primarily cubically primitive space-lattice crystalline structure, according to the alloy composition. The platinum atoms on the one hand and the atoms of the two other alloy components on the other hand assume defined crystal lattice sites thereby. The resulting space-lattice crystal structure can be described as a superlattice structure of two interpenetrating space lattices with the one being formed by the platinum atoms and the second by the two other alloy components.

The ordered alloys are distinguished by a higher ageing stability under the sharply corrosive conditions during operation in a PA fuel cell (operating temperature 170 to 200° C.; 100% phosphoric acid as electrolyte). U.S. Pat. Nos. 4,447,506 and 4,677,092 and PCT WO 91/19566 disclose the production of Pt/Co/Cr catalysts by means of a multistage process in which either one starts with a commercial Pt/C catalyst or a Pt/C intermediate stage is produced in situ. The complete and reproducible deposition of cobalt and chromium can be achieved by means of the addition of dissolved cobalt- and chromium compounds to the suspended Pt/C catalyst and by purposeful adjusting of the pH and of the temperature. For the production of the alloy catalysts ammonium chromate, chromium(III)nitrate and cobalt(II)nitrate as well as hexachloroplatinic acid are used for the in situ production of the Pt/C catalysts. After deposition of the alloy components the ordered alloy is formed by the already-mentioned thermal treatment of the catalyst. Cubic platinum alloy particles are obtained on the carbon carrier. In U.S. Pat. No. 4,677,092 the relative height of the superlattice peak $P_{110}$ in comparison to the shifted Pt(111) peak $P_{111}$ is taken as measure for the order. It was able to be shown that catalysts with a high degree of order exhibit a higher stability and lesser loss of alloy components during the operation of the fuel cells in comparison to catalysts with unordered structure.

Buchanan et al (GB-OS 2,242,203 and EP-OS 0,450, 849) describe the sequential in situ production of platinum alloy catalysts. Catalysts exhibiting a high electrochemical metal surface (ECA) and a platinum content of greater than 20% by weight of the carrier catalyst are especially advantageous. The method starts with hexachloroplatinic acid, which is added to a basic carrier suspension. The alloy components cobalt and chromium are added as chlorides or nitrates to the suspension of the non-reduced Pt/C catalyst. The alloy formation is completed as usual by thermal treatment under an atmosphere of inert gas. A preceding wet-chemical reduction or gaseous phase reduction is optional.

The described methods for producing platinum catalysts and platinum alloy catalysts exhibit various disadvantages. The deposition of the alloy components on the carrier is carried out in several stages. This process is time-consuming and in some instances necessitates large reaction volumes. The catalysts exhibit relatively high chlorine contents during individual finishing stages which can have a negative effect on the activity of the finished catalysts. The hydrolysis of the predominantly used hexachloroplatinic acid necessitates an expensive boiling of the reduction solutions under reflux.

An object of the present invention is to produce platinum alloy catalysts by means of an improved deposition method for the alloy components which catalysts are more active and more stable than traditional catalysts are. The improved production method should be distinguished by a lesser time requirement and therewith by reduced production costs in comparison to the known methods.

SUMMARY OF THE INVENTION

In achieving the above and other objects, one feature of the invention resides in a platinum alloy catalyst containing a ternary alloy consisting of the alloy components platinum, cobalt and chromium on a conductive carbon carrier. It can be obtained by a concurrent precipitation of nitrate salts of the alloy components onto a suspended carbon carrier in the form of their hydroxides. Following reducing of the precipitated hydroxide compounds, the product is washed and dried to obtain the catalytic precursor which is then subjected to a concluding calcining at temperatures above 800° C.

The catalyst of the invention is obtained in a one-stage process by means of a common precipitation of the three alloy components. Nitrate salts are used as soluble precursors of the alloy components.

In particular, platinum(IV) nitrate is used as precursor for the main component platinum of the alloy catalyst.

BRIEF DESCRIPTION OF DRAWINGS

The present invention will be further understood with reference to the accompanying drawings, wherein.

DETAILED EMBODIMENT OF THE INVENTION

Figure 1:
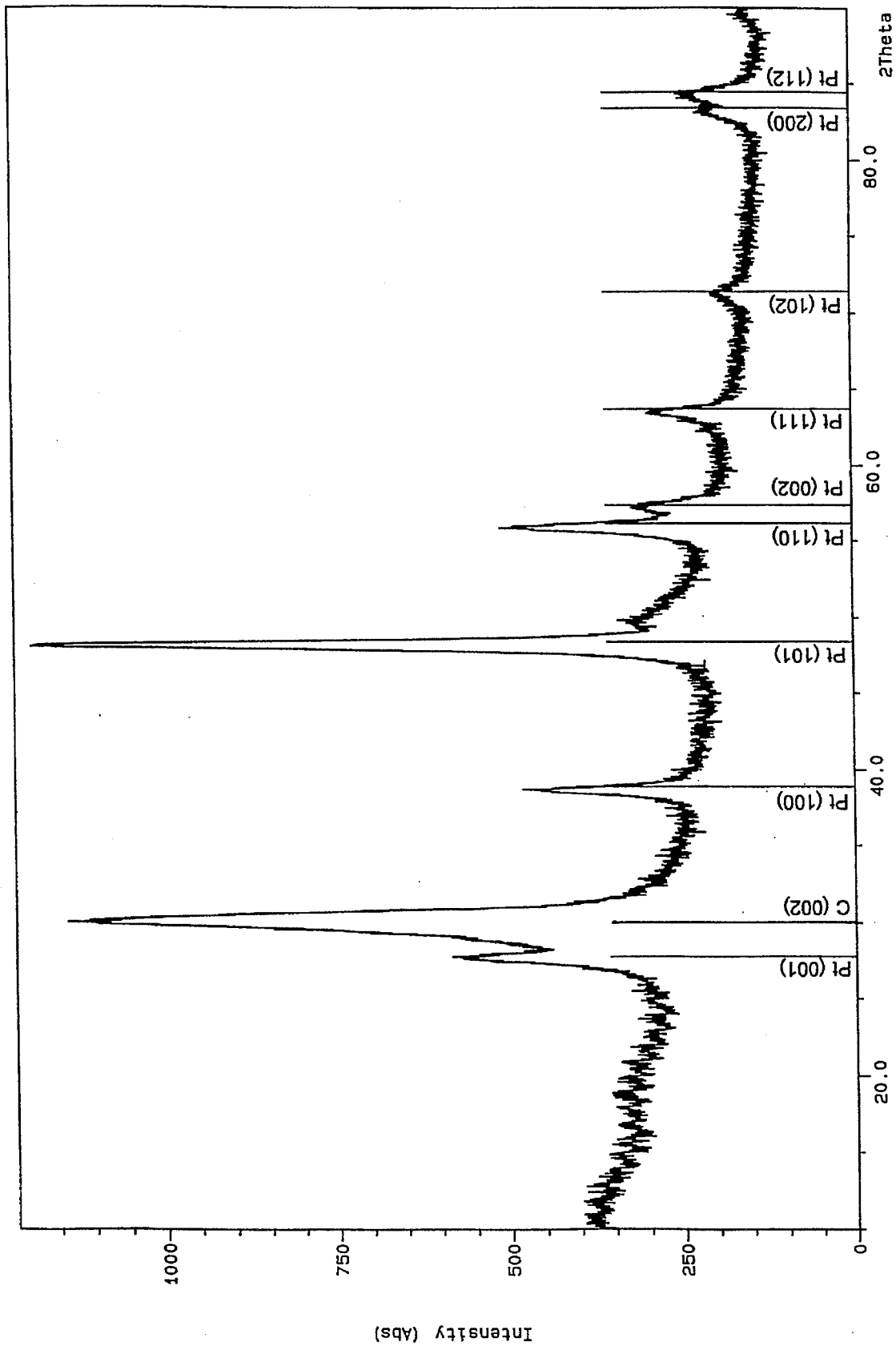
FIGS. 1 and 2 show X-ray diffraction diagrams of the catalyst produced according to example 2.

Platinum(IV)nitrate is commercially obtainable and is usually produced from hexachloroplatinic acid. It thus contains slight chlorine contents, conditioned by the production. Aside from these slight amounts of chlorine, the use of nitrate salts in accordance with the invention for all three alloy components assures extensive freedom from chlorine in the catalyst during all production steps.

Platinum(IV)nitrate is distinguished over other platinum compounds, especially over hexachloroplatinic acid, in that it can be very readily hydrolyzed. The common precipitation of all three alloy components onto the carbon carrier does not become possible until as a result of this property of platinum(IV)nitrate. The common precipitation results in finely dispersed alloy particles with a very homogeneous distribution of all three components.

The homogeneous elementary distribution makes it possible to obtain alloy particles with a largely ordered lattice structure by means of the subsequent temperature treatment and calcination. The ordered alloy structure develops during the cooling off of the catalyst in the temperature interval between 700° and 500° C. The cooling-off time to 500° C. should not drop below 30 minutes in order to allow sufficient time for the ordering process, which is based on processes of diffusion.

For the temperature treatment the catalyst is heated under an atmosphere of inert gas, usually nitrogen, at temperatures above 800° C, preferably at 900° C, and is not cooled off until after the elapsing of a retention time. The retention time should be at least 30 minutes in order to make possible a complete reduction of the alloy components and the formation of the alloy and should not exceed the time of 2 hours since as the time of the temperature treatment increases the alloy particles, which are fine at first, sinter to coarser particles. The retention time should therefore preferably be 1 hour. This results in the obtention of alloy particles with particle diameters below 60 Å (6 nm).

An atomic ratio between platinum and the two other alloy components cobalt and chromium of between 80:20 and 40:60, especially between 60:40 and 40:60 is selected for the catalysts of the invention.

The atomic ratio between cobalt and chromium can be varied within broad limits between 95:5 and 5:95. However, an atomic ratio within the limits between 60:40 and 40:60, especially an atomic ratio of 1:1 is used with preference.

For an optimum performance the content of the catalyst should be between 5 and 35% by weight platinum, preferably between 10 and 20% platinum relative to the total weight of the catalyst.

The alloy is present on the conductive carbon carrier in highly dispersed form with crystal sizes of not more than 60 Å (6 nm). The crystallites exhibit, as a function of the alloy composition, a primarily tetragonal space lattice structure with the lattice constants $a_0$ and $b_0$ of approximately 2.7 Å and $c_0$ of approximately 3.74 Å. The tetragonal space lattice structure corresponds to an intermetallic compound with the composition Pt(Co, Cr).

Graphite, conductive carbon black, especially graphitized black or their physical mixtures are suited as carrier for the alloy catalysts.

The production of the catalysts of the invention is carried out as follows in detail:

Approximately 50 g graphitized black are carefully suspended in an amount of 1.5 liters deionized water. After the suspension has been heated to 80° C. a pH of the suspension between 6.5 and 8 develops. The impregnating solution produced earlier from platinum nitrate, cobalt nitrate and chromium nitrate in deionized water is added in one portion to this suspension. The amount and the concentration of the impregnating solution are selected in accordance with the desired content of the finished catalyst with catalytically active metals or alloy components. The addition of the acidic impregnating solution to the black suspension lowers its pH.

For the complete and simultaneous precipitation of all alloy components the pH of the suspension obtained in this manner is raised by the addition of a base such as e.g. an aqueous solution of sodium carbonate or sodium hydrogencarbonate or sodium hydroxide solution, preferably sodium hydroxide solution, to a value of approximately 9.

This process is followed by a wet-chemical reduction of the alloy components by the addition of a reducing agent such as hydrazine, sodium formate, sodium boranate or formaldehyde, preferably formaldehyde.

The catalytic precursor obtained in this manner is filtered off, thoroughly washed with deionized water and dried at approximately 80° C. in a vacuum drying oven until a residual moisture of below 2% by weight.

A gaseous phase reduction can be used as an alternative to the wet-chemical reduction after filtering off and drying of the catalyst.

The dried catalytic precursor is subsequently heated up to preferably 900° C. under an atmosphere of inert gas and cooled off after a retention time of one hour within a time period 30 to 90 minutes to 500° C. An ordered alloy develops as a result of this temperature treatment from the alloy which is at first still unordered. After further cooling off to room temperature the catalyst is ready for use.

Catalysts and reference catalysts from the state of the art were produced in the following examples and reference examples and compared with each other as regards their electrochemical properties. A graphitized black Vulcan XC-72 with a specific surface of 85 m²/g was used as carrier for all catalysts. The specific surface was determined by nitrogen adsorption according to the method of Brunauer, Emmett and Teller (BET surface) in conformity with the specification in the German Industrial Standard DIN 66 132.

In addition to platinum, the base metals cobalt and chromium were selected as alloy components. The precipitation of these alloy components on the graphitized black followed the indications from the examples of the patents already cited in the case of the reference catalysts.

All catalysts were subjected after the precipitation of the alloy components and any reduction to a similar temperature treatment in order to be able to evaluate the effects of the precipitation method on the properties of the finished catalysts. This temperature treatment consisted of a heating of the particular catalyst under an atmosphere of nitrogen to 900° C., a retention time of one hour and of a cooling down to room temperature within 1.5 hours.

FIG. 1 shows an X-ray diffraction diagram after an additional sintering treatment of the finished catalyst at 900° C. for a period of 2 hours.

Figure 2:
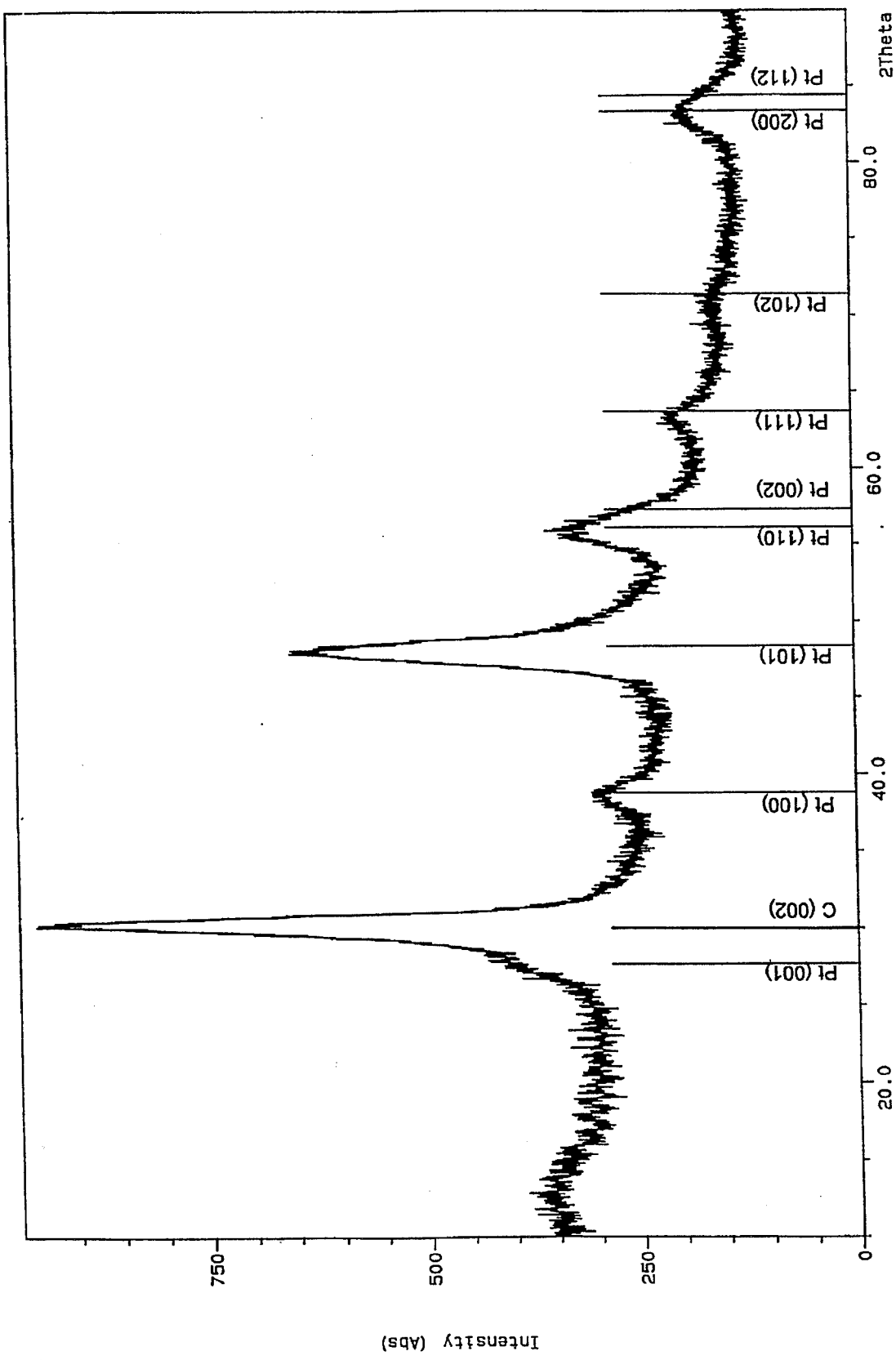

FIG. 2 shows an X-ray diffraction diagram of the finished catalyst.

Reference Example 1

A Pt/Co/Cr catalyst with 10% by weight platinum was produced in analogy with example 8 from GB-OS 2,242, 203.

Hexachloroplatinic acid serves as platinum precursor. The black was first suspended in deionized water and the suspension rendered basic by the addition of sodium hydrogencarbonate. After boiling the basic suspension for 30 minutes platinum was added in the form of hexachloroplatinic acid within 5 minutes and the mixture boiled 5 minutes longer. Then, cobalt and chromium in the form of aqueous solutions of cobalt chloride and chromium chloride were added to the suspension over a period of 10 minutes. The mixture was boiled for a period of a further 2 hours. Thereafter, this catalytic precursor was filtered off, dried and reduced at 200° C. for the period of one hour in a flow of forming gas (5% by volume $H_2$, 95% by volume $N_2$). Immediately after the reduction the catalyst was calcined as already described in order to form the ordered alloy.

The boiling of the catalyst suspension at 100° C. during the deposition of the alloy components took place in order to avoid liquid losses under reflux. The total time of the deposition method was 170 minutes from the start of the boiling of the basic black suspension to the filtering off of the catalytic precursor.

The finished catalyst contained 10% by weight platinum 1.82% by weight cobalt and 1.07% by weight chromium, corresponding to an atomic ratio of Pt:Co:Cr=48:33:19 This data concerns, as in all following examples, values determined by analyses on the finished catalyst.

Reference Example 2

A second Pt/Co/Cr catalyst with 10% by weight platinum was produced in accordance with example 1 of U.S. Pat. No. 4,447,506. Starting material was a commercial, high-surface catalyst containing 10% platinum on graphitized black Vulcan XC-72 according to U.S. Pat. No. 4,447,506 (catalyst F902X/D 10% Pt of Degussa). This catalyst was carefully suspended in deionized water. The pH of the suspension was adjusted with dilute ammonium hydroxide to a value of 8. Then the alloy element chromium in the form of an aqueous solution of ammonium chromate was added to the suspension. The pH of the mixture was then adjusted by the addition of dilute hydrochloric acid to 5.5 in order to simplify the deposition of the chromium on the platinum of the platinum catalyst. After a 15 minute agitation of the suspension the deposition of cobalt onto the catalyst by means of the addition of an aqueous solution of cobalt nitrate took place. Here too the pH of the mixture was held constant at a value of 5.5 by adding hydrochloric acid.

After the filtering off of the catalytic precursor it was calcined without preceding reduction. All steps during the precipitation of cobalt and chromium were carried out at room temperature. 60 minutes were required for the precipitation of these components. The time for the preparation of the commercial platinum catalyst is not included in this time.

The finished catalyst contained 9.7% platinum, 1.75% cobalt and 1.26% chromium, corresponding to an atomic ratio of Pt:Co:Cr=48:29:23.

Reference Example 3

A third Pt/Co/Cr catalyst with a platinum charge of 10% by weight was produced in accordance with example 1 of WO 91/19566.

For this, a suspension of graphitized black Vulcan XC-72 was again produced at first in deionized water. The suspension was heated to 90° C. and then an aqueous solution of hexachloroplatinic acid added during a time of 5 minutes. The pH of this mixture was adjusted by the addition of the amount of sodium hydroxide solution indicated in example 1 of WO 91/19566 and the entire mixture held for a further 75 minutes at a temperature of 90° C. After having cooled down to 75° C., which took about 10 minutes, the alloy elements cobalt and chromium in the form of an aqueous solution of cobalt nitrate and chromium nitrate were added to the suspension for 5 minutes. The pH of the suspension was adjusted with sodium hydroxide solution to a value in a range between 6.7 and 7.1 and the mixture agitated a further 15 minutes. The catalytic precursor obtained in this manner was filtered off, washed with a 2% ammonium hydroxide solution and dried and calcined without preceding reduction. A total of 110 minutes were required for the precipitation of the alloy components on the black carrier in this reference example. The finished catalyst contained 10.4% by weight platinum, 1.73% by weight cobalt and 1.26% by weight chromium, corresponding to an atomic ratio of Pt:Co:Cr=50:28:22.

EXAMPLE 1

50 g of a Pt/Co/Cr catalyst with 10% by weight platinum were produced as follows:

43.45 g graphitized Vulcan black were suspended in 1.5 liters deionized water and the suspension heated to 80° C. The alloy elements platinum, cobalt and chromium were added to this suspension in common as a solution of 5 g platinum as platinum(IV)nitrate, 0.9 g cobalt as cobalt (II)nitrate and 0.65 g chromium as chromium(III)nitrate in one portion in less than 5 minutes. After 15 minutes of agitating the suspension at a temperature of 75° C. the pH of the suspension was adjusted with sodium hydroxide solution to the value of 9 and maintained for a period of 30 more minutes at a temperature of 75° C. 6.8 ml formaldehyde (37%) were added for the reduction of the metal compounds deposited on the carbon black and the suspension agitated for a further 15 minutes. Thereafter the catalytic precursor was filtered off, washed with water and dried at 80° C. in a vacuum and then calcined.

Less than 65 minutes were required for the total precipitation of the alloy components, including the wet-chemical reduction.

The finished catalyst contained 9.8% by weight platinum, 1.6% by weight cobalt and 1.2% by weight chromium corresponding to an atomic ratio of Pt:Co:Cr=50:27:23.

Example 2

Example 1 was repeated with slightly altered amounts of cobalt nitrate and chromium nitrate. 5 g platinum, 0.91 g cobalt and 0.53 g chromium were precipitated on 43.56 g graphitized carbon black thereby.

The finished catalyst contained platinum, cobalt and chromium in an atomic ratio of 50:30:20.

Example 3

A Pt/Co/Cr catalyst with 20% by weight platinum was produced in analogy with example 2 by doubling the amounts of platinum salts, cobalt salts and chromium salts.

Reference Example 4

A further reference catalyst was produced in analogy with reference example 1; however, instead of hexachloroplatinic acid platinum(IV)nitrate was used. Under the method conditions of reference example 1 only an incomplete precipitation of the platinum compound on the carrier material took place. The catalyst produced in this manner exhibited a deficiency of platinum of 12% in comparison to the reference catalyst of reference example 1.

Reference Example 5

A further reference catalyst was produced in analogy with reference example 2. Hexachloroplatinic acid in reference example 2 was replaced with platinum(IV)nitrate.

The finished catalyst contained 9.7% by weight platinum, 1.75% by weight cobalt and 1.26% by weight chromium, corresponding to an atomic ratio of Pt:Co:Cr=48:29:23.

Reference Example 6

A further reference catalyst was produced in analogy with reference example 3. Here too the hexachloroplatinic acid was replaced with platinum(IV)nitrate.

The finished catalyst contained 10.4% by weight platinum, 1.73% by weight cobalt and 1.26% by weight chromium, corresponding to an atomic ratio of Pt:Co:Cr= 50:28:22.

Reference Example 7

A further reference catalyst was produced in analogy with reference example 6; however, the Pt/C stage present in the meantime was reduced with 6.8 ml formaldehyde solution (37%).

The finished catalyst contained 10% by weight platinum, 1.77% by weight cobalt and 1.03% by weight chromium, corresponding to an atomic ratio of Pt:Co:Cr=50:30:20.
Characterization of the catalysts In order to determine their electrochemical properties the catalysts of the preceding examples were processed to gaseous diffusion electrodes with a PTFE content (PTFE: polytetrafluroethylene) of 30% by weight. To this end the catalysts were dispersed in a known manner in a suspension of PTFE. A graphite paper waterproofed with PTFE was coated with the resulting suspension and the coating subsequently sintered at 340° C. The coating was adjusted so that the platinum content of the finished electrode was approximately 0.5 mg Pt/cm$^2$.

A 2 square centimeter piece of the electrode produced in this manner was tested in an electrochemical half-cell against a dynamic hydrogen electrode (DHE: dynamic hydrogen electrode) in 103% phosphoric acid at an operating temperature of 190° C. for its capacity to reduce oxygen.

The so-called oxygen mass activity and the potential at a current flow through the fuel cell of 200 mA/mg Pt were measured as characteristic data for this. The oxygen mass activity is defined as the current which develops at a potential of 0.9 V relative to the amount of platinum of the electrode, measured in mA/mg Pt. Oxygen functioned as reactant in the determination of both characteristic data. The potentials indicated are values which were corrected to eliminate the internal resistance of the electrochemical cell.

Both characteristic data were measured only after a 3-hour start-up phase. During the start-up phase the electrochemical half-cell was at an operating temperature of 190° C. During this phase the electrode was conditioned by exposure to open circuit voltage (OCV). In order to determine the ageing stability the electrode was exposed to the above-mentioned conditions for an extended time. Usually, after an ageing of 19 hours the potential was determined at 200 mA/mg Pt. The operating conditions during the ageing corresponded to the conditions during the start-up phase. The results of these measurements are listed in the following table 1. The values for the fresh state are the measured values after the start-up phase.

Reference catalyst V4 was not tested on account of too low platinum content.

The catalysts of examples B1 to B3 of the invention are distinguished by a high oxygen mass activity and a high potential at a current flow of 200 mA/mg Pt both in the fresh state as also after ageing.

For the further characterization of the catalyst the particle size of the alloy particles and crystallites and their crystalline structure were determined by X-ray diffraction with Co-K radiation. For electrochemical applications the catalyst should exhibit an extensively ordered structure at the lowest possible crystallite diameters, that is, a correspondingly large electrochemical surface.

FIGS. 1 and 2 show X-ray diffraction diagrams of the catalyst of example 2 of the invention. In order to be able to unambiguously clarify the crystalline structure of the alloy particles the catalyst was subjected prior to the taking of the diagram of FIG. 1 to an additional sintering treatment at 900° C. for a period of 2 hours. As a result of this sintering treatment the highly dispersed alloy particles coalesce to larger crystallites which yield sharper diffraction indices.

The diffraction reflexes of FIG. 1 can be associated with the plane C(002) (Miller index) of the graphitized carbon carrier and the various planes of a tetragonal space lattice of the PtCoCr alloy. These indices are characterized with Pt(001), etc. The lattice constants of the tetragonal space lattice are $a_0=b_0=2.695$ Å and $c_0=3.736$ Å.

The diffraction diagram of FIG. 2 was obtained on the finished catalyst of example B2 without additional sintering treatment. On account of the lower crystallite size the diffraction reflexes are less distinct and are broadened relative to the reflexes of FIG. 1 so that closely adjacent reflexes have fused with each other. However, a comparison of both diffraction diagrams shows that even the finished catalyst exhibits the same tetragonal space lattice structure as the additionally sintered catalyst.

The crystallite size of the alloy particles can be determined by X-ray diffraction from the half-intensity width of the strongest platinum peak Pt(001) of FIG. 2. This determination was carried out for all catalysts of the reference examples and of the examples. The results are collated in table 2.

Table 2 shows that the catalysts of examples B1 to B3 of the invention exhibit crystallite sizes below 60 Å. Only the reference catalyst of reference example V1 [ref. ex. 1] exhibits comparably favorable values. However, this catalyst has poorer electrochemical properties, probably on account of the hexachloroplatinic acid used as precursor for platinum.

The other reference catalysts exhibit larger crystallite diameters, which expresses itself in a correspondingly reduced oxygen mass activity and lower potentials at a current density of 200 mA/mg Pt.

TABLE 1

| Example | Catalyst % by wt. | Pt:Co:Cr | $O_2$ mass activity at 0.9 V in Fresh state [mA/mg Pt] | Potential in mV at 200 mA/mg Pt fresh | aged |
|---|---|---|---|---|---|
| V1 | 10 | 48:33:19 | 68 | 851 | 827 |
| V2 | 10 | 48:29:23 | 78 | 858 | 839 |
| V3 | 10 | 50:28:22 | 66 | 852 | 839 |
| B1 | 10 | 50:27:23 | 74 | 858 | 845 |
| B2 | 10 | 50:30:20 | 87 | 867 | 845 |
| B3 | 20 | 50:30:20 | 86 | 863 | 847 |
| V5 | 10 | 48:49:23 | 69 | 852 | 828 |
| V6 | 10 | 50:28:22 | 41 | 855 | 813 |
| V7 | 10 | 50:30:20 | 74 | 848 | 794 |

[Key: V = reference; B = example]

TABLE 2

| Example | Catalyst % by wt. | Pt:Co:Cr | Crystallite size (Å) |
|---|---|---|---|
| V1 | 10 | 48:33:19 | 56 |
| V2 | 10 | 48:29:23 | 72 |
| V3 | 10 | 50:28:22 | 101 |
| B1 | 10 | 50:27:23 | 48 |
| B2 | 10 | 50:30:20 | 57 |
| B3 | 20 | 50:30:20 | 56 |
| V5 | 10 | 48:49:23 | 69 |
| V6 | 10 | 50:28:22 | 165 |
| V7 | 10 | 50:30:20 | 77 |

Further modification and variations will be apparent to those skilled in the art and are intended to be encompassed by the claims appended hereto.

German priority application P 44 26 973.0 is relied on and incorporated herein by reference.

We claim:

1. A platinum alloy catalyst on a conductive carbon carrier containing as catalytically active component a ternary alloy consisting of the alloy components platinum, cobalt and chromium, prepared by a process comprising forming an aqueous suspension of carbon carrier, heating said suspension to 80° to 90° C., mixing said suspension with an aqueous solution of precursors of said alloy components, maintaining said suspension at a constant temperature of 70° to 80° C., precipitation said alloy components in the form of their hydroxides by adding a base to said suspension, reducing said alloy components with a reducing agent, washing and drying the catalytic precursor thereby obtained and calcining said catalytic precursor at temperatures above 800° C., wherein the precursors of the alloy components are nitrates which are precipitated in common onto said carbon carrier to thereby obtain said platinum alloy catalyst on said conductive carbon carrier.

2. The platinum alloy catalyst according to claim 1, wherein the atomic ratio between platinum and the two other alloy components cobalt and chromium is between 80:20 and 40:60.

3. The platinum alloy catalyst according to claim 1, wherein the atomic ratio between platinum and the two other alloy components cobalt and chromium is between 60:40 and 40:60.

4. The platinum alloy catalyst according to claim 1, wherein the alloy components cobalt and chromium are in an atomic ratio of 95:5 to 5:95 with one another.

5. The platinum alloy catalyst according to claim 1, where the alloy components cobalt and chromium are in an atomic ratio of 60:40 to 40:60 with one another.

6. The platinum alloy catalyst according to claim 1, wherein the platinum is present in an amount of 5 to 35%, by weight relative to the total weight of the catalyst.

7. The platinum alloy catalyst according to claim 1, wherein the platinum is present in an amount of 10 to 20%, by weight relative to the total weight of the catalyst.

8. The platinum alloy catalyst according to claim 1, wherein the alloy exhibits a primarily tetragonal structure and is present in the conductive carbon carrier in a highly dispersed from with crystallite sizes by X-ray diffraction of not more that 60 Å (6 nm).

9. The platinum alloy catalyst according to claim 1, wherein the carbon carrier is a member selected from the group consisting of carbon black, graphite, graphitized black, and carbides.

10. The platinum alloy catalyst according to claim 1 which has a homogeneous elementary distribution in the alloy.

11. The platinum alloy catalyst according to claim 1 which exhibits a primarily tetragonal space lattice structure with the lattice constants $a_0$ and $b_0$ of approximately 2.7 Å and $c_0$ of approximately 3.74 Å.

12. The platinum alloy catalyst according to claim 1 wherein sodium hydroxide is the base.

13. The platinum alloy catalyst according to claim 1 which has an ordered alloy structure.

14. A method of producing a platinum alloy catalyst on a conductive carbon carrier containing as catalytically active component a ternary alloy consisting of the alloy components platinum, cobalt and chromium comprising:

preparing an aqueous suspension of the carbon carrier by mixing water with a conductive carbon, heating said suspension to 80° C. to 90° C., mixing said suspension with an aqueous solution of precursors of the alloy components, thereafter maintaining said suspension at a constant temperature between 70° C. to 80° C., simultaneously precipitating the alloy components in the form of their hydroxides onto said carbon by adding a base, adding a reducing agent to reduce the alloy components to the corresponding metal, washing and drying the catalytic precursor so obtained and calcining at temperatures above 800° C. for alloy formation, wherein the precursors of the alloy components are nitrates which are precipitated in common onto the carbon carrier, the pH of the suspension being raised by the addition of sodium hydroxide solution as said base to a valve between 8 and 9 for the complete and simultaneous precipitation of the alloy components.

15. The method according to claim 9 wherein platinum (IV) nitrate is used.

16. The method according to claim 14 wherein the calcining is at a temperature of 900° C. for at least 30 minutes to obtain a complete reduction of said alloy components and to achieve formation of an ordered alloy structure.

17. The method according to claim 14 wherein the time of calcining is not greater than 2 hours.

18. The method according to claim 14 wherein the alloy components have a particle diameter below 60 Å.

19. The method according to claim 14 wherein graphitized black is suspended in deionized water, the resulting suspension is heated to 80° C. at a pH of 6.5 to 8, a solution of platinum nitrate, cobalt nitrate, and chromium nitrate in deionized water is added to said suspension, the pH of the suspension is raised to the range of 8 to 9, a reducing agent to reduce the said alloy components is added to the suspension and, calcining at a temperature above 800° C. for a sufficient period of time to achieve complete reduction of said alloy components and to achieve formation of an ordered alloy structure.

20. The method according to claim 19 wherein the catalytic precursor is filtered, washed with deionized water and dried.

21. The method according to claim 20 wherein the drying is at approximately 80° C. in a vacuum drying oven to attain a moisture of below 2% by weight.

22. The method according to claim 21 wherein the calcining is carried out under a atmosphere of inert gas.

23. The method according to claim 21 wherein the catalytic precursor after calcination is cooled off after a retention time of 1 hour and within a time period of 30 to 90 minutes down to a temperature of 500° C.

* * * * *